US010049782B2

(12) United States Patent
Elhard et al.

(10) Patent No.: US 10,049,782 B2
(45) Date of Patent: Aug. 14, 2018

(54) COATING FOR IMPROVED CARBON NANOTUBE CONDUCTIVITY

(75) Inventors: Joel D. Elhard, Hilliard, OH (US); Amy M. Heintz, Dublin, OH (US); Steven M. Risser, Reynoldsburg, OH (US)

(73) Assignee: Battelle Memorial Institute, Columbus, OH (US)

( * ) Notice: Subject to any disclaimer, the term of this patent is extended or adjusted under 35 U.S.C. 154(b) by 2303 days.

(21) Appl. No.: 12/682,777

(22) PCT Filed: Oct. 14, 2008

(86) PCT No.: PCT/US2008/079864

§ 371 (c)(1), (2), (4) Date: Jul. 12, 2010

(87) PCT Pub. No.: WO2009/052110

PCT Pub. Date: Apr. 23, 2009

(65) Prior Publication Data

US 2011/0059317 A1 Mar. 10, 2011

Related U.S. Application Data

(60) Provisional application No. 60/979,798, filed on Oct. 12, 2007.

(51) Int. Cl.
*B32B 9/00* (2006.01)
*H01B 1/24* (2006.01)

(52) U.S. Cl.
CPC .............. *H01B 1/24* (2013.01); *Y10T 428/30* (2015.01)

(58) Field of Classification Search
CPC ..... B32B 9/00; C01B 31/022–31/0293; Y10T 428/30; Y10S 977/742
USPC ........................... 428/408; 423/448; 977/742
See application file for complete search history.

(56) References Cited

U.S. PATENT DOCUMENTS

| | | | | |
|---|---|---|---|---|
| 6,683,783 | B1 | 1/2004 | Smalley | |
| 2006/0269864 | A1* | 11/2006 | Tarnawskyj et al. | 430/124 |
| 2007/0153362 | A1* | 7/2007 | Gruner | 359/315 |
| 2007/0246689 | A1* | 10/2007 | Ge et al. | 252/500 |
| 2009/0142581 | A1 | 6/2009 | Heintz | |
| 2010/0006152 | A1 | 1/2010 | Hatton | |

FOREIGN PATENT DOCUMENTS

| | | |
|---|---|---|
| WO | WO2008103703 | 8/2008 |
| WO | WO2009052110 A2 | 4/2009 |

OTHER PUBLICATIONS

International search report for WO2009052110A2 (PCT/US2008/079864), dated Dec. 4, 2010.
Lee et al., "Dispersion Stability of Single-Walled Carbon Nanotubes Using Nafion in Bisolvent", J. Phys. Chem. C 2007, 111, 2477-2483.
Geng et al., "Doping and de-doping of carbon nanotube transparent conducting films by dispersant and chemical treatment", J. Mater. Chem., 2008, 18, 1261.
Levitsky et al., "Photoactuation from a carbon nanotube—nafion bilayer composite", J. Phys. Chem. B 2006, 110, 9421-9425.
Skakalova V, Kaiser AB, Dettlaff-Weglikowska U, Hrncarikova K, and Roth S, "Effect of chemical treatment on electrical conductivity, infrared absorption, and Raman spectra of single-walled carbon nanotubes", J. Phys. Chem.. B, 2005, 109, 7174-7181.
Skakalova V et al., "Electrical and mechanical properties of nanocomposites of single wall carbon nanotubes with PMMA", Synthetic Metals, 2005, 152, 349-352.
Ferrer-Anglada N et al., "Synthesis and characterization of carbon nanotube-conducting polymer thin films", Diamond and Related Materials, 2004, 13(2), 256-260.
Berkowitz M, "Density functional approach to frontier controlled reactions", JACS, 1987, 109, 4823-4825.
Cardenas C, Tiznado W, Ayers PW, and Fuentealba P, "The Fukui potential and the capacity of charge and the global hardness of atoms", J. Phys. Chem. A, 2011, 115, 2325-2331.
Zhan C-G, Nichols JA, and Dixon DA, "Ionization potential, electron affinity, electronegativity, hardness, and electron excitation energy: molecular properties from density functional theory orbital energies", J. Phys. Chem. A, 2003, 107, 4184-4195.
Zhang G and Musgrave CB, "Comparison of DFT methods for molecular orbital Eigenvalue calculations", J. Phys. Chem. A, 2007, 111, 1554-1561.
Information disclosure statement (IDS) form for U.S. Appl. No. 12/682,777.

* cited by examiner

*Primary Examiner* — Daniel H Miller
(74) *Attorney, Agent, or Firm* — C. Michael Gegenheimer; Frank Rosenberg

(57) ABSTRACT

We discovered that the use of certain dopants or dopant moieties in polymeric coating formulations, that when applied over carbon nanotubes, unexpectedly decrease the measured electrical resistance of the coated carbon nanotubes (CNTs), when measured through the coating, even though the polymer coatings themselves do not have bulk conductivity. CNT compositions with enhanced electrical conductivity and methods of making such compositions are described. The CNTs are preferably coated with a dopant or dopant moiety having a HOMO energy of −7.0 eV or lower.

19 Claims, No Drawings

COATING FOR IMPROVED CARBON NANOTUBE CONDUCTIVITY

RELATED APPLICATIONS

This application is a national stage filing and claims the priority benefit of PCT/US08/79864 filed Oct. 14, 2008 and also claims the benefit of priority from provisional U.S. patent application Ser. No. 60/979,798 filed on Oct. 12, 2007.

INTRODUCTION

Carbon nanotubes (CNTs) are being explored in a variety of applications that exploit their high electrical conductivity. Some specific examples include transparent electrodes; high strength, conductive fibers; and electrically conductive coatings.

Polymer encapsulants for these CNT materials are desired for several reasons. The resistance of CNTs is sensitive to elevated temperature, humidity, and solvent exposure. An encapsulation coating could potentially improve the stability of carbon nanotubes to these processing and/or environmental conditions. Recently, there has been concern about potential hazards of human exposure to carbon nanotubes. An encapsulation coating would prevent human exposure to CNTs during handling of CNT-containing products. Fibers or filaments of CNTs often require a sizing, or coating, over the fiber to improve the handling or finish of the fiber surface. Finally, the proper encapsulation coating could potentially be used to enhance the CNT film properties. For example, the percent transmission of a transparent CNT coating on plastic film could be lowered by reducing reflection losses at the plastic/air interface using a low refractive index (RI) polymer.

To realize the benefits of a polymer encapsulant, the encapsulation layer must be relatively thick, thicker than the distance that an electron can tunnel. Many applications require that electrical contact can be made perpendicular to the plane of the film. The presence of an insulating polymer layer usually significantly increases the electrical resistance normal to the surface. This limits the utility of encapsulation coatings.

Nafion is a well known sulfonated tetrafluoroethylene copolymer that is used in some proton exchange membrane fuel cells. It has also been used as a dispersing agent for carbon nanotubes. See, for example, Lee et al. "Dispersion Stability of Single-Walled Carbon Nanotubes Using Nafion in Bisolvent," J. Phys. Chem. C 2007, 111, 2477-2483.

In the publication Geng et al. "Doping and de-doping of carbon nanotube transparent conducting films by dispersant and chemical treatment," J. Mater. Chem., 2008, 18, 1261 the same group reported that while "p-type doping effect was observed with Nafion" the "remaining Nafion increased the surface resistance of the CNT film." They observe that the sheet resistance is decreased if the Nafion is removed, e.g. by nitric acid washing. Geng et al. shows that the use of 10:1 Nafion:CNT loadings to produce films increases the resistance of CNT films and that the Nafion, at any loading, increases the resistance of the film. This is the opposite of our discovery that a Nafion coating resulted in decreased sheet resistance.

Levitsky et al. in "photoactuation from a Carbon Nanotube—Nafion Bilayer Composite," J. Phys. Chem. B 2006, 110, 9421-9425 report the preparation of a carbon nanotube film on a 180 μm thick Nafion film and the photoactuation of the composite film.

Rinzler et al. in PCT/US08/54372 write about materials that may contain carbon nanotubes and polymers in which certain charge transfer agents are covalently attached to polymer backbones. The polymer-coupled charge transfer agents provide doping of carbon nanotubes. Rinzler et al. state that the materials can be used in a wide variety of electronic devices. Rinzler et al. do not mention band gap, symmetry of the highest occupied molecular orbital (HOMO), thickness of a polymer layer, and conduction through an insulating polymer.

SUMMARY OF THE INVENTION

During our efforts to develop encapsulation coatings for CNTs, we discovered polymeric coating formulations that when applied over carbon nanotubes unexpectedly decrease the measured electrical resistance of the coated CNTs or CNT films, when measured through the coating. Moreover, the polymer coatings themselves are not electrically conductive.

It is believed that, in the inventive materials, the dopant-containing polymer films contain nanophase structures that are capable of transporting charge when in contact with a CNT surface. Locally phase-separated, dopant-filled encapsulants increase the conductivity of CNT films, as measured perpendicular to the plane of the film, and can be used to provide other properties such as adhesion, decreased reflection, durability, and stability.

In a first aspect, the invention provides a CNT containing composite that includes: a layer of CNTs, and a polymeric coating in direct contact with the layer of CNTs. The polymeric coating comprises a dopant or dopant moiety having a HOMO energy of −7.0 eV or lower. In the layer of CNTs, at least 80% (by mass) of the CNTs (preferably at least 90% by mass) have a closest contact with another CNT of 0.5 nm or less (preferably a closest contact of 0.4 nm or less). The CNT-CNT contacts (also known as CNT-CNT spacing) can be observed by transmission electron spectroscopy (TEM) of a cross-section. The CNT-CNT contacts do not include CNTs in a bundle (which have not been dispersed), but the contacts in a conductive network. For example, in a CNT composition that has been dispersed in a suspension and deposited in a film, it is the smallest distance between CNTs that had been dispersed.

In any of the inventive aspects, in some embodiments, the polymeric coating does not contain Nafion, and in some embodiments, the dopant moiety does not contain a sulfonic acid. In some embodiments, the dopant or dopant moiety lacks an inversion center and lacks a symmetry plane.

In a second aspect, the invention provides a method of coating a CNT film, comprising: providing a CNT layer; and applying a dopant or dopant moiety having a HOMO energy of −7.0 eV or lower onto the CNT layer. The invention also includes CNT composites made by the above method. These composites differ from composites made by CNT composite films made from dispersed CNT fibers in which a dopant or dopant-containing polymer is added to the dispersion; for example, the films made by the above method are believed to have greater fiber-fiber contacts and superior electrical properties.

In another aspect, the invention provides a method of decreasing the resistivity of a CNT material, comprising: providing a CNT material; and contacting the CNT material with a dopant having a HOMO energy of −7.0 eV or lower or a molecule comprising a dopant moiety having a HOMO energy of −7.0 eV or lower. In this aspect, the dopant having a HOMO energy of −7.0 eV or lower or the molecule comprising a dopant moiety having a HOMO energy of −7.0 eV or lower, has a molecular weight of 1000 or less.

In a further aspect, the invention provides a CNT containing composite, comprising: CNTs and a polymeric coating; wherein the polymeric coating material is nonconductive; and wherein resistance is measured through the polymeric coating and wherein the composite has a lower resistance than the CNTs without the polymeric coating. A material is non-conductive if it has a resistance of $10^{10}$ ohm per square or greater or a bulk resistivity of $10^{12}$ ohm·cm or greater.

In another aspect, the invention provides a CNT containing composite, comprising: CNTs and a polymeric coating; wherein the polymeric coating comprises a polymer and a liquid charge transfer agent.

In some preferred embodiments of the invention, the composite comprises a planar surface. In some preferred embodiments, both surfaces of the polymer coating are planar. In some embodiments, the CNTs are a layer of CNTs, preferably a substantially planar layer.

In some preferred embodiments, the CNT structure is a continuous macroscopic fiber of a length of at least 1 mm, preferably at least 1 cm, and in some cases 100 cm or more, a smallest dimension (diameter) of at least 0.5 μm, in some embodiments at least 25 μm, and in some embodiments 10 μm to 500 μm. In some preferred embodiments, the charge transfer agent is a liquid and the polymer is a solid.

Some preferred forms of CNT material are CNT networks (especially network films) and ropes (also called threads). A CNT layer has a thickness of at least 2 nm, in some embodiments 2 nm to 1000 nm, and an area of at least 1 $\mu m^2$ (square micrometer), preferably at least 10 $\mu m^2$. The area is the macroscopic area (i.e., the viewed area), it is not surface area as measured by BET; thus a US standard sheet of letter paper has an area of 8.5 inches by 11 inches, although its BET surface area is much higher. Typically, CNT layers are formed from dispersions, but the bulk raw materials used to form these dispersions are typically not CNT layers.

In several aspects of the invention, we refer to a dopant or dopant moiety having a HOMO energy of −7.0 eV or lower. The invention also encompasses alternative aspects that are instead described by the compounds and compound types described in the Detailed Description section.

The invention includes any of the composites and methods of making composites as described above, or in the detailed description below. The invention includes materials made by the methods described herein. The invention also includes devices containing the composites.

The materials and methods of the present invention can provide advantages such as increased conductivity and superior stability. The materials can be used in a wide variety of electronic applications. Thus, the invention includes electronic devices such as (but not limited to, i.e., comprising) touch panels, displays, antennas, solar cells, LCD panels, solid state lighting, electronic textiles, and window de-icing, containing the inventive materials.

As is typical of patent terminology, "comprising" means including and permits other components. In any of the descriptions, the invention includes articles and methods where "comprising" can be replaced by the more limiting terms "consisting essentially of" and "consisting of."

DETAILED DESCRIPTION

The term "carbon nanotubes" or "CNTs" includes single, double and multiwall carbon nanotubes and, unless further specified, also includes bundles and other morphologies. The invention is not limited to specific types of CNTs. The carbon nanotube structure, particularly the diameter, will determine the best dopant. Smaller diameter semiconducting CNTs require stronger (lower HOMO energy per our derived selection criteria) than large diameter CNTs. Suitable carbon nanotubes include single-wall carbon nanotubes prepared by HiPco, Arc Discharge, CVD, and laser ablation processes; double-wall carbon nanotubes (DWNTs), blends of single double triple wall carbon nanotubes, few wall carbon nanotubes, and multiwall carbon nanotubes, as well as covalently modified versions of these materials. The CNTs can be any combination of these materials, for example, a CNT composition may include a mixture of single and multiwall CNTs, or it may consist essentially of DWNT and/or MWNT, or it may consist essentially of SWNT, etc. CNTs have an aspect ratio (length to diameter) of at least 50, preferably at least 100, and typically more than 1000.

The CNTs are preferably in the form of a CNT/air composite, for example a nanotube network film, a paper or cloth-like layer of CNTs, or a macroscopic fiber of CNTs. Solid CNT compositions of the present invention preferably contain at least 25 weight % CNT, in some embodiments at least 50 wt %, and in some embodiments 25 to 100 wt % CNT. The CNTs can be distinguished from other carbonaceous impurities using methods known to those skilled in the art, including NIR spectroscopy ("Purity Evaluation of As-Prepared Single-Walled Carbon Nanotube Soot by Use of Solution-Phase Near-IR Spectroscopy," M. E. Itkis, D. E. Perea, S, Niyogi, S. M. Rickard, M. A. Hamon, H. Hu, B. Zhao, and R. C. Haddon, Nano Lett. 2003, 3(3), 309) or Raman, thermogravimetric analysis, or electron microscopy (Measurement Issues in Single Wall Carbon Nanotubes. NIST Special Publication 960-19) The volume fraction of films or other CNT compositions is preferably at least 2% CNTs, more preferably at least 5%, and in some embodiments 2 to about 90%. The remainder of the composite may comprise air (by volume) and/or other materials such as residual surfactant, carbonaceous materials, dispersing agent, or the polymeric coating (by weight and/or volume).

A CNT layer is defined as a solid CNT composition, such as a CNT network; it is not a dispersion of CNTs in a polymer matrix. Typically, a cross-sectional view of the composite material will show a polymer layer that contains little or preferably no CNTs and a CNT network layer that comprises CNTs (and possibly other carbonaceous materials that commonly accompany CNTs) with little or no polymer. CNT networks and CNT fibers have very distinct rope-like morphology as observed by high resolution SEM or TEM. See for example Hu, L.; Hecht, D. S.; and Gruner, G. *Nano Lett.*, 4 (12), 2513-2517 for CNT networks and U.S. Pat. No. 6,683,783 for images of CNT fibers. Because the CNT layers contain little or no polymer, they exhibit surface roughness, if characterized by AFM, associated with the CNT diameter and bundle size, in the range of 0.5 to 50 nm CNT network layers have many contacts between CNTs and good conductivity that is, a resistivity less than 0.02 Ω·cm, preferably less than 0.002 Ω·cm. The CNT layer may be planar, cylindrical, or other contiguous geometry; in some preferred embodiments, the CNT layer is substantially planar (similar to a sheet of paper or a nonwoven textile sheet, a few fibers may project from a planar layer).

The inventive composite materials comprise a dopant, doping moiety, or charge transfer agent. Semiconducting CNTs can be p-doped or n-doped by appropriate electron acceptors or donors, respectively, via charge transfer doping. Given that semiconducting CNTs constitute a large fraction of CNT structures, dopants offer a route for improving conductivity of individual CNTs. It has been observed that p-dopants are more effective for increasing the conductivity than n-dopants. This has been attributed to the p-type characteristics of CNTs, which may be inherent or may be due to the presence of chemisorbed $O_2$. However, under the appropriate conditions, treatment of CNTs with n-dopants can decrease the sheet resistance. Nonetheless, p-dopants are preferred for achieving conductivity enhancement of native CNTs.

Conventional thought is that the effectiveness of a p-dopant is determined by the energy of its LUMO (lowest unoccupied molecular orbital) relative to the Fermi energy of the CNT. In this view, the LUMO acts as the orbital which would be occupied by an electron donated from the CNT. Similarly, conventional thought holds that the effectiveness of an n-dopant is determined by the energy of the HOMO (highest occupied molecular orbital) relative to the Fermi energy of the CNT. An electron occupying the HOMO would be the electron donated to the CNT during the doping.

We performed calculations on a set of p-dopants to verify these predicted relations, and to better relate the chemical structure of a dopant to its doping effectiveness. We compared experimental data on the effectiveness of a p-dopant to decrease the sheet resistance of CNTs and the characteristics of the molecular orbitals of the CNT and the dopant. The molecular orbital calculations were performed on force-optimized gas-phase geometries using B3LYP/6-31G* method. This level of theory has been shown to adequately predict the HOMO and LUMO of small organic molecules.

Comparison of the effectiveness of a dopant to its LUMO energy showed there was no correlation between the two quantities. Instead, we have found that the effectiveness of a dopant to change the resistance of CNTs can be correlated to the properties of the p-dopant's highest occupied molecular orbital (HOMO). This is in direct contrast to the conventional view of the energy relation for a p-dopant. The correlation, though strong, was insufficient to fully explain the weak doping behavior of some molecules, particularly some of the aromatic dopants.

The second feature needed to determine the effectiveness of a dopant to decrease the sheet resistance of a CNT is a large overlap between the HOMO and the frontier orbitals of the CNT. According to frontier orbital theory, the interaction between orbitals is enhanced when there is a strong overlap between the orbitals, which is often described as the orbitals having the same symmetry. However, the condition is more accurately described in terms of the orbital overlap. We qualitatively assessed the degree of overlap between the dopant molecule and a CNT by first calculating the HOMO and LUMO for a small CNT fragment, terminated on the tube ends with hydrogen atoms ($C_{120}H_{24}$). The overlap between the molecular orbital of the CNT fragment and the HOMO of the dopant of interest can be qualitatively assessed by placing the dopant of interest next to the CNT fragment, while having the HOMO of the dopant displayed. The overlap is assessed on the basis of its localization and sign changes. If the dopant's HOMO is localized in a small region of space, it has a greater probability of having a high degree of overlap. This is due to the fact that the CNT frontier orbital has nodes and sign changes. A HOMO that is localized can interact strongly with the CNT at a single site, leading to a large overlap. A HOMO that is distributed over a wide region will often be out of phase with the CNT orbital, so the total overlap of the orbitals is small.

In general, we found that the dopant molecules in Table 1 with a high degree of symmetry, such as 7,7,8,8-tetracyanoquinodimethane, do not have a large overlap of their HOMO with the frontier orbitals of the CNT. As shown in Table 1, these molecules also are poor dopants, in their ability to decrease the resistance of CNTs.

TABLE 1

Comparison of dopant effectiveness and HOMO characteristics.

| Name | Rank | HOMO (eV) | large overlap HOMO (eV) | small overlap HOMO (ev) |
|---|---|---|---|---|
| Triflic acid | Excellent | −9.35 | −9.35 | |
| Trichloromethyl sulfonic acid | Excellent | −9.02 | −9.02 | |
| Thionyl Chloride | Excellent | −8.76 | −8.76 | |
| Gold (III) chloride | Excellent | −8.91 | −8.91 | |
| Phosphoryl Chloride | Excellent | −9.25 | −9.25 | |
| Iodine | Good | −7.14 | −7.14 | |
| Nitrobenzene | Good | −7.59 | −7.59 | |
| Benzonitrile | Good | −7.26 | −7.26 | |
| Selenium Oxychloride | Good | −8.70 | −8.70 | |
| 2,3-dichloro-1,4-napthoquinone | Poor | −7.46 | | −7.46 |
| 2,6-dichloro-1,4-benzoquinone | Poor | −7.88 | | −7.88 |
| 7,7,8,8-tetracyanoquinodimethane | Poor | −7.33 | | −7.33 |
| 3,5-dinitrobenzotrifluoride | Poor | −8.73 | | −8.73 |
| nitrophthalic anhydride | Poor | −8.17 | | −8.17 |
| 2,6-dichloro-cyclohexadiene-1,4-dione | Poor | −7.88 | | −7.88 |
| 2,3,5,6-tetrachlorobenzoquinone | Poor | −7.76 | | −7.76 |
| 2,3,5,6-Tetrafluoro-7,7,8,8-tetracyanoquinodimethane (F-TCNQ) | Poor | −7.61 | | −7.61 |
| Pentafluorophenol | Poor | −6.64 | −6.64 | |
| Pyrazine | Poor | −6.83 | | −6.83 |

In general, we find that preferred p-dopants have low HOMO, less than −7.0 eV (i.e. larger negative number), and have HOMO with a large overlap with the CNT frontier orbitals. Often this occurs for dopants where the dopant does not possess a high degree of symmetry. Dopants that do not have a high degree of symmetry are those lacking an inversion center (i) and lacking a symmetry plane (σ). These symmetry element terms are recognized by persons skilled in the art as described in publications such as Quantum Chemistry, $2^{nd}$ Ed. By Ira N. Levine, Chapter 12, Molecular Symmetry and Molecular Vibrations. The Theory of Infrared and Raman Vibrational Spectra by E. Bright Wilson, Jr., J. C. Decius, and Paul C. Cross, Chapter 5. Symmetry Considerations. A molecule has an inversion center when, for any atom in the molecule, an identical atom exists diametrically opposite this center an equal distance from it. A molecule has a symmetry plane when there exists a plane of reflection through which there is an identical copy of the original molecule.

The overlap is determined to be large if, when the dopant molecule is placed adjacent to the CNT in a reasonable orientation, the large positive regions of the dopant HOMO overlap primarily with large positive regions of the CNT orbital and the large negative regions of the dopant HOMO overlap primarily with large negative regions of the CNT orbital. Alternately, the overlap is determined to be large if, when the dopant molecule is placed adjacent to the CNT in a reasonable orientation, the large positive regions of the dopant HOMO overlap primarily with large negative regions of the CNT orbital and the large negative regions of the dopant HOMO overlap primarily with large positive regions of the CNT orbital. The overlap is determined to be small if, when the dopant molecule is placed adjacent to the CNT in a reasonable orientation, the large positive regions of the dopant HOMO overlap somewhat equally with both large positive and negative regions of the CNT orbital and the large negative regions of the dopant HOMO overlap somewhat equally with both large positive and negative regions of the CNT orbital.

Some nonlimiting examples of doping agents include Bronsted acids, Lewis acids, and pi-acids such as thionyl chloride, selenium oxychloride, phosphoryl chloride, nitrobenzene, benzonitrile, iodine, aurous chloride, $(CNS)_2$, and $(IrCl_6)^{2-}$ and molecules with strong electron withdrawing groups such as $CF_2SO_3H$, $CCl_2SO_3H$, $—NO_2$, —CN, $—CF_3$, —S(O)Cl, $SO_2Me$, $NMe_3^+$, and $N_2^+$. In some embodiments, the invention includes any possible combination or subcombinations of the listed doping agents. Examples of the electron withdrawing groups are provided for the perfluoroalkyl sulfonic acid functional group and include:

| | |
|---|---|
| $CF_2═CF—SO_3H$ | −9.12 (−7.75) |
| $CF_2═CF—CF_2—SO_3H$ | −9.30 (−8.21) |
| $CF_2═CF—SO_3H$ | −9.03 (−7.89) |
| $CF_3—CF═CF—SO_3H$ | −9.35 (−8.46) |
| $CF_3(CF_3)—CF—SO_3$ | −9.43 |
| $R_2—O—CF_2CF_2—SO_3H$ | −9.29 |
| $R_1—CF(R_2)—SO_3$ | |
| $R_1—C(R_1)═CF(R_1)—SO_3$ | |

where the HOMO for the electron acceptor is shown (along with the HOMO for the entire molecule (in parenthesis), $R_1$ includes a halogen, any organic or polymer group including straight-chain or branched hydrocarbons (including alkanes, alkenes and alkynes), straight chain or branched fluorinated and perfluorinated alkanes, straight chain or branched chlorinated alkanes, aromatics and polycyclic aromatics, aliphatic and aromatic ethers, halogenated aromatics, and esters, and $R_2$ includes any of the above but excludes halogens. In some embodiments, the R group is a $C_1$ to $C_{20}$ alkane or alkene.

Examples of other preferred dopant candidates include alkylsulfonic acid chlorides, such as: $R_3—SO_2—Cl$ where e.g. $R_3$ is n-propyl [CAS number 10147-36-1] (−8.60 eV) or n-octyl [7795-95-1] (−8.47 eV) or their corresponding alkyl sulfonic acids products. Other preferred dopant candidates include sulfonic acid anhydrides such as: $R_4—SO_2—O—SO_2—R_5$; such as where $R_4$ and/or $R_5$ are $—CH_3$ [7143-01-3] (−7.24 eV) or $—CF_3$ (−9.74 eV), respectively., or larger e.g. nonafluorobutane sulfonic anhydride [36913-91-4].

In some preferred embodiments, the dopant or dopant moiety is present in a range of 0.002 to 0.6 mol dopant or dopant moiety to gram CNT, and in some embodiments, 0.02 to 0.2 mol dopant or dopant moiety to gram CNT.

The dopants or polymers containing a perfluoroalkyl sulfonic acid functional group are preferred in some embodiments, and in some preferred embodiments the dopants include one or more of the perfluoroalkyl sulfonic acid functional groups listed above. On the other hand, in some embodiments, the CNTs are not coated with dopants or polymers containing a perfluoroalkyl sulfonic acid functional group, in some embodiments, the CNTs are not coated with Nafion, and in some embodiments the CNT composite materials do not contain fluorine (in view of the persistence of fluorinated organics in the environment, it may be desirable to avoid such compounds). In some preferred embodiments, the doping agent has a molecular weight of 1000 Daltons (also known as atomic mass units) or less, in some embodiments 500 or less, and in some embodiments 300 or less (lower mass may provide some advantages such as smaller effective diameter of CNT fibers and/or higher conductivity per mass).

While, in general, there is no restriction on the group that may be tethered to the electron withdrawing group, the impact of the substitution on the HOMO properties, as described above are important. The HOMO of the electron acceptor orbital can be assessed, as described above, and preferably has an energy of −7.0 eV or less (i.e., a larger negative number) and a large overlap with the CNT frontier orbitals. For example, a $—CF_2SO_3H$ that is covalently attached to a pyrene group has a HOMO of −8.38 eV and should be a good dopant. Alkyl-substitution of F-TCNQ increases the HOMO to −6.64 eV, and it is a poor dopant.

Other doping moieties can be identified through routine experimentation using the techniques described in the examples section to test for a decrease in sheet resistance on a CNT structure.

To achieve an enhancement in conductivity of a CNT polymer composite, a dopant or dopant moiety can be combined with a polymer system. The polymer can serve as a reservoir for the dopant, increasing its stability and improving its interaction with CNTs.

It is known that under certain conditions, insulating polymers are capable of transporting charge. The existence of localized states, often formed due to the presence of chain ends, defects, incorporation of foreign atoms, or configurational irregularity, such as in copolymers or heterotactic polymer, allows extended electronic charge transport to occur by resonance tunneling transport. The localized states are defined as nanoscopic regions of localized donor or acceptor states that may be considered to exist in oxidized or reduced forms around which the polarizable polymer reorganizes to stabilize the charge. In general, charge transport is observed near dielectric breakdown of the polymer, at high fields. The localized phase segregation can be observed by appropriate techniques such as x-ray photoelectron spectroscopy (XPS), time-of-flight secondary ion mass spectroscopy (TOF-SIMS), or other techniques for studying surface properties. Alternatively, the inventive composites can be characterized by electrical measurements through the polymer film (typically the conductance from an electrode to an electrode through the composite material where the electrodes are not in direct contact with the carbon nanotubes).

At low electric field strength, $<10^8$ V/m, where many electrical devices operate, the dopant-filled polymer systems are not electrically conductive. The coating system only becomes electrically conductive upon contact with the CNT coating. This may occur due to charge injection from the CNT surface. When the redox energy of the localized state is above or below the Fermi level of the CNT, the CNTs can inject holes or electrons, respectively, into the polymer under weak electric field. While not being bound by theory, the increase in conductivity observed may also be due to favorable interaction between the electron donating and withdrawing groups on the preferred base polymer and the electron withdrawing groups of the preferred solvents. In the presence of CNTs, these electron donating and withdrawing groups help to form a network that facilitates charge transfer compared to comparative hydrocarbon polymers alone.

In some preferred embodiments of our invention, the dopant-filled polymer coating in contact with a CNT coating simultaneously decreases the sheet resistance of the CNT layer and facilitates charge transfer through the polymer layer. Charge transport through the polymer layer is strongly dependent on the distance between localized states, the extension of the localized states, and the redox characteristics of these states. The dopant moieties within the polymer facilitate the formation of localized states. Copolymers or polymers having large heterogeneity between the backbone and the sidechain are preferred. By controlling the phase behavior of the formulation, e.g. through increasing the relative volume fraction of dopant, copolymer units, and end groups, the number of localized states and their distance can be controlled. The use of characterization tools such as TOF-SIMS can be used to examine these local nanostructures. Charge injection generally depends on the electron affinity of the polymer system. Low electron affinity polymers or states are preferred for hole injection and high electron affinity polymers or states are preferred for electron injection.

The presence of electron withdrawing compounds (p-dopants) such as, but not limited to, fluoralkyl-substituted sulfonic acids, benzonitrile, and nitrobenzene with high dipole moment can also act as charge transfer intermediates, accepting charge from the semiconducting CNTs and increasing the conductivity of the film.

In addition to the potential to forming localized states locally, the polymer of the inventive system preferably does not have any inherent negative effects on the sheet resistance of the CNT layer; in other words, it should not, by itself increase the sheet resistance of the CNT layer. Polymers containing strong electron donating groups, such as amines, tend to compensate n-dope the p-type CNTs, which increases their sheet resistance. The suitability of a polymer system can be tested by placing two parallel silver electrodes on a CNT film to create a square, measuring the initial baseline sheet resistance, applying a solution of the candidate polymer coating to the center of the CNT sample (coating only the inner region of the CNT network), and measuring the sheet resistance. For preferred polymer systems, the sheet resistance should not increase as measured with electrodes directly contacting the CNT layer or measured through the polymer.

A dopant-filled polymer coating may be prepared by blending a dopant or mixture of dopants with an appropriate polymer or mixture of polymers. In preferred embodiment, the polymer and dopant species are compatibilized using a third component. For example, the polymer may be dissolved in a solvent that is co-compatible with the dopant. Common useful solvents include aromatic hydrocarbons such as toluene or xylene, ether such as diethyl ether, tetrahydrofuran, or dioxane, polar aprotics such as dimethyl formamide or dimethylsulfoxide, halogenated hydrocarbons such as chloroform or methylene chloride, ketones such as acetone or methyl ethyl ketone, water, and alcohols, such as isopropanol. In another embodiment, the polymer is soluble in the dopant. In some embodiments, the dopant is a liquid or semi-solid at room temperature with a boiling point greater than 100° C., in some embodiments a boiling point greater than 120° C. (at standard conditions).

Some preferred polymers should have semi-crystallinity, and/or a $T_g$ greater than 50° C., chemically or physically crosslinked structure, high transparency, and polar functional groups that can interact with dopants. By controlling the combination of semi-crystallinity (a type of physical crosslink), chemical crosslink density, physical crosslink density, and $T_g$, the stability of the dopant to high temperature and/or high humidity aging may be improved.

Sequestering of the dopants can be further improved by increasing the molecular weight of the dopant or grafting the dopant to the polymer, where grafting describes covalently attaching the dopant moiety to a polymer backbone. In some preferred embodiments, a dopant-grafted polymer is dissolved in water. For dopant moieties that are grafted to polymer chains, the important characteristic is the HOMO on the accepting group and not the HOMO of the entire molecule. The polymer tether should be chosen so that the HOMO of the electron accepting group has an energy of −7.0 eV or less (i.e., a more negative number) and will have a large overlap with the CNT frontier orbitals. An example of a grafted charge transfer species/polymer could be, for example, tetrafluoroethylene-perfluoro-3,6-dioxa-4-methyl-7-octenesulfonic acid copolymer or other perfluoroalkyl sulfonic acid copolymers such as Nafion or Hyflon.

In one preferred embodiment, the dopant-filled polymer is Nafion. Nafion is known to form local regions, with sulfonic acid clusters dispersed within the fluorocarbon matrix. The sulfonic acids groups serve as doping moieties. The HOMO of the sulfonic acid group in these systems has energy of approximately −9.3 eV.

The dopant-containing polymer can be a commercially obtainable material, such as Nafion, or produced by adding a dopant to a base polymer (for example adding nitrobenzene to a polymer), or by reacting a base polymer with a dopant moiety that forms a covalent bond to the polymer, or by polymerizing (including copolymerizing) monomers and/or oligomers in the presence of a dopant and/or by polymerizing monomers or oligomers that contain a dopant moiety. In broader aspects of the invention, the base polymer is not limited and can be any polymer.

Appropriate polymers depend on the dopant and the end use application. The enhancement effect is facilitated by providing favorable interactions between the dopant and the polymer, as well as the formation of locally inhomogeneous states. Suitable polymers include (but are not limited to) typical barrier polymers such as copolymers of polymethacrylonitrile, polyacrylonitrile, polymethylmethacrylate, or polyvinylidine chloride or copolymer of ethylene and norbornene, as well as polymers such as polysulfones, polyacrylonitrile (PAN), styreneacrylonitrile (SAN), polystyrene (PS), phenolic resins, phenol formaldehyde resin, polyacenaphthalene, polyacrylether, polyvinylchloride (PVC), polyvinylalcohol (PVA), polyvinylidene chloride, poly(p-phenylene terephthalamide), poly-L-lactide, polyimides, polyacrylonitrile copolymers, such as poly(acrylonitrile-methyl acrylate), poly(acrylonitrile-methyl methacrylate), poly(acrylonitrile-itaconic acid-methyl acrylate), poly(acrylonitrile-vinyl pyridine), poly(acrylonitrile-vinyl chloride) and poly(acrylonitrile-vinyl acetate), polypropylene, polyester resins, acrylic resins, epoxy resins, poly(ethylene terephthale), poly(butylene terephthalate), poly(methyl methacrylate), polycarbonate, poly(ether ether ketone), polyvinylidene chloride copolymers, polymethacrylonitrile vinylidenechloride methylacrylate terpolymers, cyclic olefin copolymers, styrene ethylene butylene styrene copolymers, polycarbonate, polyesters, polysulfones, acrylics, poly(tetrafluoroethylene), poly(perfluoroalkyl methacrylate), poly(perfluoralkyl acrylate), and mixtures thereof. Mixtures thereof includes, in various embodiments, all of the combinations/permutations of the above listed polymers.

It may also be desirable for the polymer to have additional properties such as high transparency, good abrasion resistance, good adhesion, low refractive index, or high barrier properties to materials such as water or oxygen.

The dopant-filled (also called dopant-containing) polymer may be applied to CNT structures. A layer of the dopant-filled polymer formulation may be formed on or applied to a CNT film, composite, fiber, or collection of fibers. The CNT material is in direct contact with the dopant-filled polymer layer.

The polymer film thickness is desirably chosen to maximize its sequestering effect on the charge transfer agent but minimize its insulating effect. In some embodiments, the thickness of an encapsulation layer is 1000 nm or less, preferably 500 nm or less, in some embodiments 400 nm or less, and in some embodiments the thickness of the encapsulation layer is between 15 and 500 nm.

A coating can be applied onto a CNT structure by known solution casting methods. Spin coating is one such method. A structure, upon which an encapsulation layer can be disposed can be, for example, a CNT network, CNT/polymer composite coating, CNT/polymer composite, CNT/inorganic composite, and CNT macroscopic fiber.

In another aspect, the invention provides a multi-layer structure comprising a substrate, a storage layer, a CNT layer in direct contact with the storage layer, and a polymeric coating over the CNT layer. A storage layer is a polymer layer that contains a reservoir of dopant so that, if some dopant migrates away from the CNTs, additional dopant can migrate from the storage layer into interaction with the CNTs.

In some applications, it is desirable that the electrical conductivity enhancement is observed when conductivity is measured by metal electrodes, such as metal foil or metal paint busbars. The sheet resistance of the dopant-filled polymer coated CNTs can be assessed by using a silver adhesive to paint two parallel electrodes along opposite edges of a rectangular sample, creating a 1" by 1" square, and placing contacts from an ohmmeter to the silver electrodes.

The sheet resistance of the dopant-filled polymer coated CNTs can be measured using a 4-point probe technique as is known in the art. In this case, the points would be in contact with the encapsulant.

The sheet resistance of the CNTs (preferably a CNT layer) can be measured prior to coating. The sheet resistance of the dopant-filled polymeric coating is measured with coating disposed (with an equal thickness) on an insulating substrate. Preferably, the sheet resistance of the polymeric coating is measured on a coating that is applied under the same conditions onto an insulating substrate. Alternatively, if possible, the dopant-filled polymer coating can be stripped off and the sheet resistance of the CNTs (that is, the CNT structure) and/or the polymer layer is measured in the delaminated state. Stripping off might be accomplished mechanically or chemically (for example, dissolving or oxidizing away the polymer); however, care should be taken to avoid altering the remaining structure(s).

Evidence of p-doping can be determined spectroscopically, for example, by examining the optical absorbance spectrum before and after coating with locally phase-separated, dopant filled encapsulant. The optical absorbance spectrum of CNTs is characterized by S22 and S11 transitions, whose positions depend upon the structure distribution of the CNTs and can be determined by a Kataura plot. These two absorption bands are associated with electron transitions between pairs of van Hove singularities in semiconducting SWNTs. Depletion of filled states by an electron acceptor results in bleaching of these transitions, and evidence of p-doping by the subject coating.

In some preferred embodiments, the inventive composite has a resistivity of 0.005 Ω·cm or less, more preferably 0.0005 Ω·cm or less. In some preferred embodiments that the inventive composite has a percent transmission at 550 nm of greater than 75%, more preferably greater than 90%.

For some applications, it is desirable that CNT films possess electrical conductivity and transparency. It is possible to increase the transmission of a film by reducing reflection loss at the interface between regions with a large refractive index difference using a thin layer of a third material at this interface, with the refractive index of this layer between the refractive indices of the two primary media. Optimally, the refractive index of this layer should be the geometric mean of the indices of the surrounding layers, but substantial reduction in reflection can be obtained with a film refractive index far from this ideal value. To be effective, the film must have a thickness of 25 nm or greater. Thus, the dopant-filled polymer formulations in this invention offer promise in providing conductivity enhancement and transmission enhancement. Thus, for example, an electrical device may comprise a substrate, a CNT layer, a polymer layer, and an anti-reflective layer. There can be an interface between the anti-reflective layer and a surrounding medium which is typically air or other gas but may be any medium with a refractive index that is different than the polymer layer. The interface is the area at the border of the anti-reflective layer and the surrounding medium. The polymer layer is in direct contact with the CNT layer which is disposed between the substrate and the polymer layer. The anti-reflective layer has a refractive index that is between that of the polymer and the surrounding medium.

In some preferred embodiments, the dopant-filled polymer coating has a refractive index of 1.41 or less, more preferably of 1.35 or less. In some preferred embodiments the thickness of the dopant-filled polymer coating is between 10 nm and 500 nm. The thickness of the coating can be determined using optical methods such as ellipsometry and interference spectroscopy, or profiling methods such as profilometry or AFM (where a portion of the film is removed to create a step), or electron microscopy methods combined with ion milling.

EXAMPLES

Influence of Coating on CNT Resistance

Initial sheet resistance was determined by measuring the resistance at two silver electrodes painted outside the edges of a square sample to create a 1 inch by 1 inch square. Film thickness was determined by ellipsometry at 633 nm using the known refractive index of the polymers. The sheet resistance after coating was measured using silver electrodes painted directly onto the polymer coating the CNT film.

Comparative Example 1

A thin film of Ixan PNE 288 was applied to glass by spin coating a 5 wt % solution in nitrobenzene at 2000 rpm. The resulting film was dried at 150° C. for 10 minutes. The thickness of this film was approximately 175 nm. The sheet resistance of the sample was offscale, greater than 10^10 ohms/square.

Comparative Example 2

A thin CNT film was prepared on PET using literature methods. The sheet resistance of the film was 5220 ohms/square. The sample was then treated with nitrobenzene by spin coating at 2000 rpm and then drying at 150° C. for 10 minutes. The sheet resistance was 3786 ohms/square after treatment, a −27% change.

Comparative Example 3

A thin CNT film was prepared on PET using literature methods. The resistance of the film was 1580 Ω/square. The sample was coated with a 640 nm thick layer of Topas 6017 by spincoating from a 5 wt % solution of xylene at 2000 rpm. The sample was dried at 150° C. for 10 minutes. The resistance was 1725 Ω/square after treatment, a 9% increase.

Comparative Example 4

A thin CNT film was prepared on PET using literature methods. The resistance of the film was 1770 Ω/square. The sample was coated with a layer of Cytop CTX-109A by spincoating from a 4 wt % solution in perfluorotriethylamine at 2000 rpm. The sample was dried at 150° C. for 10 minutes. The sheet resistance was 2130 Ω/square after treatment, a 20% increase.

Examples 1-4

Thin CNT films were prepared on PET using literature methods. The resistances of the film varied from 1660 ohm/square to 2240 ohms/square due to slight differences in the thickness of the samples (see Table). The CNT samples were coated with different thicknesses of Ixan PNE 288 by spincoating 5-10 wt % solutions in nitrobenzene at rates from 1000 to 2000 rpm. The samples were dried at 150° C. for 10 minutes. The resistance was found to decrease in all cases. The greatest decrease was observed for a coating thickness of 425 nm, which decreased from 2240 Ω/square to 840 Ω/square, a −63% change.

Example 5

A thin CNT film was prepared on PET using literature methods. The resistance of the film was 2020 n/square. The sample was coated with a 640 nm thick layer of Topas 6017 by spincoating from a 5 wt % solution of 5% nitrobenzene in xylene at 2000 rpm. The sample was dried at 150° C. for 10 minutes. The resistance was 1736 n/square after treatment, a 14% decrease Comparative Example 5

A thin CNT film was prepared on PET using literature methods. The resistance of the film was 1039 Ω/square. The sample was coated with two layers of polymer. The first layer was 175 nm thick Ixan PNE 288 cast from nitrobenzene. The second layer was 175 nm thick Topas 6017 cast from xylene. After drying at 150° C. for 10 minutes, the resulting sample showed resistance of 1695 Ω/square, a 63% increase.

Example 6

A thin CNT film was prepared on PET using literature methods. The resistance of the film was 1039 Ω/square. The sample was coated with two layers of polymer. The first layer was 175 nm thick Topas 6017 cast from xylenes. The second layer was 175 nm thick Ixan PNE 288 cast from nitrobenzene. After drying at 150° C. for 10 minutes, the resulting sample showed resistance of 945 Ω/square, a 9% decrease.

Example 7

A thin CNT film was prepared on PET using literature methods. The resistance of the film was 2160 Ω/square. The sample was coated with a 202 nm thick layer of Ixan PNE 288 by spincoating from a 5 wt % solution of benzonitrile at 2000 rpm. The sample was dried at 150° C. for 10 minutes. The resistance was 1131 n/square after treatment, a 48% decrease.

Examples 1-4 demonstrate that the resistance of CNT films may be decreased by treating with the dopant-filled polymers described in this invention, where the dopant is nitrobenzene. As shown in Comparative Example 1, the coating formulation itself is not conductive. Comparison of Comparative Example 2 and Example 3 shows that the dopant-filled polymer coating is more effective at decreasing the resistance than treating the CNTs with the dopant alone. As shown in Comparative Examples 3 and 4, overcoating CNTs with polymer typically results in an increase in the resistance.

| | | Layer 2 | | | Layer 3 | | | Resistance before | Resistance after | |
|---|---|---|---|---|---|---|---|---|---|---|
| Sample | Layer 1 CNT | Polymer | Solvent | Thickness (nm) | Polymer | Solvent | Thickness (nm) | Coating Ω/sq | Coating Ω/sq | % change |
| Comparative 1 | n/a | Ixan PNE 288 | nitrobenzene | 212 | | | | | OL | OL |
| Compative 2 | HiPco | n/a | nitrobenzene | n/a | | | | 5220 | 3786 | −27% |
| Example 1 | HiPco | Ixan PNE 288 | nitrobenzene | 172 | | | | 2220 | 1725 | −22% |
| Example 2 | HiPco | Ixan PNE 288 | nitrobenzene | 212 | | | | 1840 | 1165 | −37% |
| Example 3 | HiPco | Ixan PNE 288 | nitrobenzene | 425 | | | | 2240 | 840 | −63% |
| Example 4 | HiPco | Ixan PNE 288 | nitrobenzene | 828 | | | | 1660 | 1120 | −33% |
| Comparative 3 | HiPco | Topas 6017 | Xylene | 640 | | | | 1580 | 1725 | 9% |
| Example 5 | HiPco | Topas 6017 | xylene + 5% nitrobenzene | 640 | | | | 2020 | 1736 | −14% |

-continued

| Sample | Layer 1 CNT | Layer 2 Polymer | Layer 2 Solvent | Layer 2 Thickness (nm) | Layer 3 Polymer | Layer 3 Solvent | Layer 3 Thickness (nm) | Resistance before Coating Ω/sq | Resistance after Coating Ω/sq | % change |
|---|---|---|---|---|---|---|---|---|---|---|
| Comparative 4 | HiPco | Cytop CTX-109A | Perfluorotriethyl amine | | | | | 1770 | 2130 | 20% |
| Comparative 5 | HiPco | Ixan PNE 288 | nitrobenzene | 175 | Topas 6017 | xylene | 175 | 1039 | 1695 | 63% |
| Example 6 | HiPco | Topas 6017 | Xylene | 175 | Ixan PNE 288 | nitrobenzene | 175 | 1039 | 945 | −9% |
| Example 7 | HiPco | Ixan PNE 288 | benzonitrile | 202 | | | | 2160 | 1131 | −48% |

OL = Resistance is too high to be registered by meter

As shown through Examples 1-4 and 7, application of Ixan PNE288 from nitrobenzene or benzonitrile to a CNT film decreases its sheet resistance. The resistance can be measured through the insulating polymer layer. As seen in Comparative Example 1, the polymer is not conductive itself.

While nitrobenzene is found to be a weak dopant, as shown by Comparative Example 1, it is important to note that the effect is enhanced by the addition of a polymer (Example 3). There is an optimal coating thickness that leads to the largest reduction in resistance.

As shown in Example 5 and Comparative Example 1, nitrobenzene was an effective dopant while xylene was not.

As shown by Comparative Example 5 and Example 6, the performance of multi-layer coatings depends on the order in which the coatings are applied. Surprisingly, placing the film in direct contact with the preferred coating and overcoating with a standard barrier coating resulted in an increase in the resistance. The preferred multilayer had the preferred coating as the outer layer. This may be attributed to the lower electron affinity of the Topas 6017 (copolymer of ethylene and norbornene) than of the Ixan PNE 288 (a terpolymer of methacrylonitrile, vinylidene chloride, and methyl methacrylate), which when in contact with the CNTs, facilitates charge injection from the CNT surface.

Influence on Stability

Because the dopant-filled polymer coatings provide conductivity enhancement in films thicker than 100 nm, they can be used to provide barrier properties to diffusion of volatile compounds such as water and oxygen or volatile dopants. The films also have superior stability compared to uncoated doped films.

Comparative Example 6

A thin CNT film was prepared from high purity CVD SWNTs on PET. The resulting film has a percent transmission at 550 nm of 75%. The sample was treated with a known doping agent, thionyl chloride. The resistance after drying at 60° C. for 10 min was 37 Ω/square. The sample was then exposed to 150° C. for 10 minutes. The resistance increased to 55 Ω/square. The sample was then exposed to 85% relative humidity at 85° C. for 64 h. The resistance increased to 74 Ω/square.

Comparative Example 7

A thin CNT film was prepared from high purity CVD SWNTs on PET. The resulting film has a percent transmission at 550 nm of 60%. The sample was treated with a known doping agent, thionyl chloride. The resistance after drying at 60° C. for 10 min was 22 Ω/square. The sample was then exposed to 150° C. for 10 minutes. The resistance increased to 32 Ω/square. The sample was then exposed to 85% relative humidity at 85° C. for 64 h. The resistance increased to 39 Ω/square.

Example 8

A thin CNT film was prepared from high purity CVD SWNTs on PET. The resulting film has a percent transmission at 550 nm of 75%. The sample was coated with 425 nm of Ixan PNE 288 from nitrobenzene solution. The resistance after drying at 60° C. for 10 min was 51 Ω/square. The sample was then exposed to 150° C. for 10 minutes. The resistance increased to 53 Ω/square. The sample was then exposed to 85% relative humidity at 85° C. for 64 h. The resistance increased to 70 n/square.

Example 9

A thin CNT film was prepared from high purity CVD SWNTs on PET. The resulting film has a percent transmission at 550 nm of 60%. The sample was coated with 425 nm of Ixan PNE 288 from nitrobenzene solution. The resistance after drying at 60° C. for 10 min was 26 Ω/square. The sample was then exposed to 150° C. for 10 minutes. The resistance decreased to 24 Ω/square. The sample was then exposed to 85% relative humidity at 85° C. for 64 h. The resistance increased to 32 Ω/square.

| Sample | Treatment | % T (550 nm) | Resistance after Treatment (Ω/sq) | Resistance after 10 min at 150° C. (Ω/sq) | Resistance after 64 h at 85% RH and 85° C. (Ω/sq) |
|---|---|---|---|---|---|
| Comparative Example 5 | Thionyl Chloride | 75 | 37 | 55 | 74 |
| Comparative Example 6 | Thionyl Chloride | 60 | 22 | 32 | 39 |

-continued

| Sample | Treatment | % T (550 nm) | Resistance after Treatment (Ω/sq) | Resistance after 10 min at 150° C. (Ω/sq) | Resistance after 64 h at 85% RH and 85° C. (Ω/sq) |
|---|---|---|---|---|---|
| Example 8 | 425 nm Ixan PNE 288 from Nitrobenzene | 75 | 51 | 51 | 70 |
| Example 9 | 425 nm Ixan PNE 288 from Nitrobenzene | 60 | 26 | 24 | 32 |

Comparative Example 8

A thin CNT film was prepared from HiPco SWNTs on PET. The initial resistance was approximately 2700 ohms/square. The sample was treated with thionyl chloride. The resistance after drying at 60° C. for 10 min was 675 Ω/square. The sample was then exposed to 85% relative humidity at 85° C. for 86 h. The resistance measured at humidity and temperature after this time 2508 Ω/square. The sample was removed from the environmental chamber and equilibrated to room temperature. After two months the resistance was 2744 ohms/square, indicating that sample is completely de-doped.

Example 10

A thin CNT film was prepared from HiPco SWNTs on PET. The initial resistance was approximately 1690 Ω/square. The sample was immersed in thionyl chloride for 15 minutes and then dried at 60° C. for 10 min The sample was then coated with 425 nm of Ixan PNE 288 from nitrobenzene solution. The resistance after drying at 60° C. for 10 min was 809 Ω/square. The sample was then exposed to 85% relative humidity at 85° C. for 86 h. The resistance measured at humidity and temperature after this time was 1407 Ω/square. The sample was removed from the environmental chamber and equilibrated to room temperature. After one month the resistance was 1363 ohms/square.

Example 11

A thin CNT film was prepared from HiPco SWNTs on PET. The initial resistance was approximately 1830 Ω/square. The sample was immersed in thionyl chloride for 15 minutes and then dried at 60° C. for 10 min The sample was then coated with 175 nm of Ixan PNE 288 from nitrobenzene solution. The resistance after drying at 60° C. for 10 min was 498 Ω/square. The sample was then exposed to 85% relative humidity at 85° C. for 86 h. The resistance measured at humidity and temperature after this time was 1409 Ω/square. The sample was removed from the environmental chamber and equilibrated to room temperature. After one month the resistance was 1370 ohms/square.

Example 12

A thin CNT film was prepared from HiPco SWNTs on PET. The initial resistance was approximately 1415 Ω/square. The sample was immersed in thionyl chloride for 15 minutes and then dried at 60° C. for 10 min The sample was then coated with 175 nm of Topas 6017 from xylenes, dried, and then coated with 175 nm of Ixan PNE 288 from nitrobenzene solution. The resistance after drying at 60° C. for 10 min was 914 Ω/square. The sample was then exposed to 85% relative humidity at 85° C. for 86 h. The resistance measured at humidity and temperature after this time was 1414 Ω/square. The sample was removed from the environmental chamber and equilibrated to room temperature. After one month the resistance was 1379 ohms/square.

While nitrobenzene is a good dopant, it is not as strong as some conventional dopants such as bromine or thionyl chloride. As shown by Comparative Example 8, a 4× decrease in sheet resistance is often observed. Nonetheless, due to the stabilization effect of the coating formulations, the ultimate sheet resistance maintained for dopant-filled polymer coated samples is lower than that of a conventionally doped, but uncoated sample. For example, comparison of Comparative Example 6 and Comparative Example 7 with Example 8 and Example 9 show that coated films exhibit better stability to exposure to high temperature and humidity. The observation that nitrobenzene, which is only a weak dopant, yields significant enhancement in the inventive systems, indicates that even better results can be expected in this coating system using stronger dopants.

Doped films may also be stabilized by treating with the coating formulation described here. The stability is maintained if measurements are carried out at high humidity. It is known that the humidity increases the resistance of carbon nanotubes. Likewise, the resistance of nanotubes is temperature dependant, usually decreasing in the range from room temperature to 100° C. As shown in the FIGURE, coated samples from Example 10 and Example 12 exhibited virtually no increased resistance, while the bare doped sample Comparative Sample 8 showed a significant increase in resistance.

After long-term aging, uncoated doped samples are completely dedoped, while coated doped samples maintain a doped effect.

Influence on Reflectivity

Comparative Example 9

A thin CNT film on a PET substrate was characterized by 4-point probe and UV-Vis spectroscopy. The film had a sheet resistance of 1272 Ω/square and a percent transmission of 82.1% at 550 nm.

Example 13

A film with the same properties as those from Comparative Example 9 was coated with a 50 nm thick coating of perfluoroalkyl sulfonic acid copolymer, Nafion (Ion Power; equivalent weight of 1100 g/mol), which has a refractive index of 1.34. The sheet resistance as measured by 4-point probe through the film was 783 Ω/square (38% decrease in sheet resistance). The percent transmission was 84.5% (3% increase in transmission).

As demonstrated by Example 13, coating a film with 50 nm of dopant-filled polymer system provides both conductivity and transparency enhancement. The perfluoroalkyl sulfonic acid groups have a HOMO energy of approximately −9.0 eV, and serve as good p-dopants, while the structure of Nafion is known to form locally phase-separated states. The conductivity enhancement is observed through the dopant-filled polymer coating for coating thickness of 50 nm, which is sufficient to provide reduced reflection at the PET/air interface due to its low refractive index.

Upon exposure of samples from Comparative Example 9 and Example 13 to an environmental chamber at 85° C. and 85% RH for 40 h, the sample in Example 13 maintained its conductivity and transparency enhancement, relative to the Comparative Example 9. Adhesion testing, by the common Scotch tape test method, showed that sample from Comparative Example 9 failed the adhesion test, while the sample from Example 13 passed the adhesion test.

This example demonstrates that the use of a locally phase-separated, dopant-filled encapsulant system can provide conductivity, transparency, stability, and adhesion enhancement.

Dopant Selection

Example 14

A thin CNT film on a PET substrate was characterized by 4-point probe. The film had a sheet resistance of 274 Ω/square. The film was treated with a 1% solution of perfluoro(4-methyl-3,6-dioxaoct-7-ene)sulfonic acid in acetone for 30 min The sample was dried overnight and then characterized by 4-point probe. The sheet resistance had decreased to 192 Ω/square.

Example 15

A thin CNT film on a PET substrate was characterized by 4-point probe. The film had a sheet resistance of 335 Ω/square. The film was treated with a 1% solution of heptadecafluoroctane sulfonic acid in water for 30 min The sample was dried overnight and then characterized by 4-point probe. The sheet resistance had decreased to 193 Ω/square. The sample was heat treated at 100° C. for 12 h, and then characterized by 4-point probe upon cooling. The sheet resistance remained 193 Ω/square.

What is claimed:

1. A method of coating a CNT film, comprising:

providing a CNT layer;

providing a polymeric coating in direct contact with the CNT layer, wherein the polymeric coating comprises a dopant or dopant moiety having a HOMO energy of −7.0 eV or lower onto the CNT layer.

2. A CNT composite made by the method of claim 1.

3. The CNT containing composite of claim 2, comprising:

a CNT layer;

a polymeric coating in direct contact with the CNT layer; and wherein the polymeric coating comprises a dopant or dopant moiety having a HOMO energy of −7.0 eV or lower;

wherein, in the layer of CNTs, at least 80% (by mass) of the CNTs have a closest contact with another CNT of 0.5 nm or less.

4. A CNT containing composite, comprising:

a CNT layer;

a polymeric coating in direct contact with the layer of CNTs; and wherein the polymeric coating comprises a dopant or dopant moiety having a HOMO energy of −7.0 eV or lower;

wherein, in the layer of CNTs, at least 80% (by mass) of the CNTs have a closest contact with another CNT of 0.5 nm or less.

5. The CNT composition of claim 2 wherein the polymeric coating does not contain a sulfonated tetrafluoroethylene copolymer.

6. The CNT composition of claim 2 wherein the dopant or the dopant moiety does not contain a sulfonic acid.

7. The CNT composition of claim 2 wherein the dopant or dopant moiety lacks an inversion center and lacks a symmetry plane.

8. The CNT composition of claim 2 wherein the CNT layer is substantially planar.

9. The CNT containing composite of claim 4 wherein the dopant or dopant moiety is selected from the group consisting of selenium oxychloride, phosphoryl chloride, nitrobenzene, benzonitrile, iodine, aurous chloride, $(CNS)_2$, $(IrCl_6)^{2-}$, $CF_2SO_3H$, $CCl_2SO_3H$, $—NO_2$, —CN, $—CF_3$,—S(O)Cl, $SO_2Me$, $NMe_3^+$, and $N_2^+$ and combinations thereof.

10. The CNT containing composite of claim 4 wherein the dopant or dopant moiety lacks an inversion center and lacks a symmetry plane.

11. The CNT containing composite of claim 4 wherein the dopant or dopant moiety comprises: $CF_2{=}CF—SO_3H$, $CF_2{=}CF—CF_2—SO_3H$, $CF_2{=}CF—SO_3H$, $CF_3—CF{=}CF—SO_3H$, $CF_3(CF_3)—CF—SO_3$, $R_2—O—CF_2CF_2—SO_3H$, $R_1—CF(R_2)—SO_3$, $R_1—C(R_1){=}CF(R_1)—SO_3$,where $R_1$ comprises a halogen, any organic or polymer group including straight-chain or branched hydrocarbons, straight chain or branched fluorinated and perfluorinated alkanes, straight chain or branched chlorinated alkanes, aromatics and polycyclic aromatics, aliphatic and aromatic ethers, halogenated aromatics, and esters, and $R_2$ includes any of the above but excludes halogens, alkylsulfonic acid chlorides, $R_3—SO_2—Cl$ where $R_3$ is n-propyl or n-octyl or their corresponding alkyl sulfonic acids products, $R_4—SO_2—O—SO_2—R_5$ where $R_4$ and $R_5$ are $—CH_3$ and —CF3 respectively, nonafluorobutane sulfonic anhydride, and combinations thereof.

12. The method of claim 1 wherein the polymeric coating comprises a dopant that has a molecular weight of 500 Daltons or less.

13. The method of claim 1 wherein the polymer coating is prepared by blending a dopant with a polymer or mixture of polymers.

14. The method of claim 13 wherein the dopant is a liquid at room temperature and has a boiling point greater than 100° C.

15. The CNT composite of claim 2 wherein the dopant is grafted to a polymer and the polymer coating comprises the dopant-grafted polymer.

16. The CNT composite of claim 4 wherein the dopant is grafted to a polymer and the polymer coating comprises the dopant-grafted polymer.

17. The CNT composite of claim 4 wherein the polymer coating has a thickness of between 15 and 500 nm.

18. The CNT composite of claim 4 having a resistivity of 0 0.0005 Ω·cm or less and a percent transmission at 550 nm of greater than 90%.

19. The CNT composite of claim 18 further comprising an anti-reflective layer having a thickness of at least 25 nm.

* * * * *